United States Patent [19]

Coburn

[11] Patent Number: 4,948,495
[45] Date of Patent: Aug. 14, 1990

[54] HIGH LIQUID YIELD PROCESS FOR RETORTING VARIOUS ORGANIC MATERIALS INCLUDING OIL SHALE

[75] Inventor: Thomas T. Coburn, Livermore, Calif.

[73] Assignee: The United States of America as represented by the United States Department of Energy, Washington, D.C.

[21] Appl. No.: 224,414

[22] Filed: Jul. 26, 1988

[51] Int. Cl.[5] .................. C10G 1/00; C10G 1/08
[52] U.S. Cl. .................... 208/407; 208/410; 585/241; 201/36
[58] Field of Search ............... 208/410, 411, 435, 419, 208/407, 409; 201/10, 12, 36; 585/240, 241

[56] References Cited

U.S. PATENT DOCUMENTS

| | | | |
|---|---|---|---|
| 2,377,728 | 6/1945 | Thomas | 208/419 |
| 2,393,636 | 1/1946 | Johnson | 201/12 |
| 2,627,499 | 2/1953 | Krebs | 202/6 |
| 2,643,219 | 6/1953 | Carr, Jr. et al. | 208/410 |
| 2,725,348 | 11/1955 | Martin et al. | 201/12 |
| 3,281,349 | 10/1966 | Evans | 208/411 |
| 3,475,317 | 10/1969 | Huntington | 208/419 X |
| 3,850,739 | 11/1974 | Wunderlich et al. | 208/411 |
| 4,078,991 | 3/1978 | Goldstein | 208/120 |
| 4,125,453 | 11/1978 | Tamm et al. | 208/410 |
| 4,298,453 | 11/1981 | Schoennagel et al. | 208/410 X |
| 4,430,195 | 2/1984 | Oltrogge | 208/410 |
| 4,619,738 | 10/1980 | Lewis et al. | 201/12 |
| 4,648,965 | 3/1987 | McMath, Jr. | 208/410 X |

Primary Examiner—Glenn Caldarola
Attorney, Agent, or Firm—L. E. Carnahan; Henry P. Sartoria; William R. Moser

[57] ABSTRACT

This invention is a continuous retorting process for various high molecular weight organic materials, including oil shale, that yields an enhanced output of liquid product. The organic material, mineral matter, and an acidic catalyst, that appreciably adsorbs alkenes on surface sites at prescribed temperatures, are mixed and introduced into a pyrolyzer. A circulating stream of olefin enriched pyrolysis gas is continuously swept through the organic material and catalyst, whereupon, as the result of pyrolysis, the enhanced liquid product output is provided. Mixed spent organic material, mineral matter, and cool catalyst are continuously withdrawn from the pyrolyzer. Combustion of the spent organic material and mineral matter serves to reheat the catalyst. Olefin depleted pyrolysis gas, from the pyrolyzer, is enriched in olefins and recycled into the pyrolyzer. The reheated acidic catalyst is separated from the mineral matter and again mixed with fresh organic material, to maintain the continuously cyclic process.

9 Claims, 2 Drawing Sheets

HIGH LIQUID YIELD PROCESS FOR RETORTING VARIOUS ORGANIC MATERIALS INCLUDING OIL SHALE

The U.S. Government has rights in this invention pursuant to Contract No. W-7405-ENG-48 between the U.S. Department Of Energy and the University of California for the operation of the Lawrence Livermore National Laboratory.

BACKGROUND TO THE INVENTION

This invention relates generally to the retorting of high molecular weight organic materials, and more particularly to such retorting processes that provide high liquid yields.

Oil shale is a sedimentary rock that contains a solid and combustible organic matter, called kerogen, within a mineral matrix. Kerogen is a high molecular weight organic material whose composition is indefinite in that it significantly varies from deposit to deposit. Although it is largely insoluble in petroleum solvents, when kerogen is heated, or pyrolyzed, it decomposes to yield some liquid shale oil, the amount strongly depending on the conditions under which the pyrolysis is carried out. The present invention involves the aboveground processing of oil shale, wherein the shale is mined, crushed, and then pyrolyzed to produce shale oil.

For shale oil production to be economical, the retort processing of the oil shale is very preferably continuous. Generally speaking, continuous retorts may be heated by burning the residual organic matter of spent oil shale within the retort, or heated by preheating various materials, such as spent shale, gas, sand, rocks or even ceramic balls, in an exterior furnace that is sometimes separately supplied with fuel, and then circulating the preheated material through the retort. It is presently believed that the thermal conversion of kerogen to liquid shale oil is best achieved via the rapid heating provided by solid-to-solid heat transfer techniques. These processes can be carried out at low temperatures and near ambient pressures, and often utilize fluidized bed retort vessels somewhat similar to those used for catalytic cracking by the petroleum industry. Even though it is very convenient to use burnt oil shale for heat transfer, heating via a more inert solid can often result in the production of more shale oil.

Various catalysts are sometimes used in oil shale processing. Hydrocarbon cracking catalysts are used in various phases of shale oil upgrading. These catalysts, which are typically clays, modified clays, or zeolites, are believed to interact with volitile hydrocarbons to effect the scission, or breaking, of carbon-to-carbon bonds, or to initiate other molecular rearrangements. However, cracking catalysts are not presently used to improve yields in the oil shale retorting process.

Tar sands are high molecular weight organic materials that are defined herein as sands that are fully or partially saturated by oil or bitumen.

Solvent refined coal is a high molecular weight organic material that is defined herein as the solid product from a coal processing plant that uses solvent refining to beneficiate coal. A very well known solvent refined coal plant is the SRCl plant located at Wilsonville, Alabama.

Petroleum residua are high molecular weight organic materials defined herein as the material that remains after the complete distillation of crude oil, crude oil products, or partially refined crude oils.

Polyethylenes are high molecular weight organic materials that are polymers of ethylene, and comprise a form of light, tough, thermoplastic synthetic resins. Polyethylenes frequently contain minor additives or other incorporated monomers.

Polystyrene is a high molecular weight organic material that is a polymer of styrene in its various forms and modifications.

Heavy oil is a term used in the petroleum industry for non-volatile oils.

Bitumens are any of a number of inflammable mineral substances consisting mainly of hydrocarbons, including the hard, brittle varieties of asphalt, the semisolid maltha, and mineral tars.

Pure rubber is a hydrocarbon having the composition $C_5H_8)_x$, that is often altered by vulcanization and the addition of additives to give it various desired properties. Synthetic rubber may be any of various artificial substances that more or less closely resemble natural rubber and, especially, may be made by the polymerization of unsaturated hydrocarbons such as butadiene, isoprene, dimethyl-butadiene, and the like.

Goldstein, in U.S. Pat. No. 4,078,991 issued Mar. 14, 1978, teaches a method for treating clay materials, such as montmorillonite, to prepare a super-active catalyst for use in the catalytic upgrading of organic materials, such as heavy crude petroleum stock and mineral-free kerogen, at temperatures below about 250 degrees centigrade.

Wunderlich et al, in U.S. Pat. No. 3,844,929 issued Oct. 29, 1974, disclose the retorting of crushed oil shale by tumbling the shale with hot special heat-carrying pellets.

Krebs, in U.S. Pat. No. 2,627,499 issued Feb. 3, 1953, teaches the catalytic distillation of oil shale in a fluidized mass, wherein a finely divided conventional cracking catalyst has a particle size substantially larger than the particle size of the oil-bearing mineral during the distillation process.

Shabtai, in U.S. Pat. No. 4,238,364 issued Dec. 9, 1980, discusses types of molecular sieve cracking catalysts that consist of acidic forms of partially cross-linked smectites, and that include ions of hydrogen and rare-earth elements.

The size of the oil shale deposits of the world is enormous. Even though the potential of this shale is great, commercial production of shale oil has generally been considered uneconomic. Presently, there is virtually no commercial production of shale oil in the United States. It is, therefore, quite obvious that there is currently an urgent need for oil shale retorting processes that will provide enhanced yields of liquid product. There is a similar need for liquid product retorting processes for organic materials such as tar sands, solvent refined coal, petroleum residua, polyethylene, polystyrene, heavy oil, bitumen, and rubber wastes.

SUMMARY OF THE INVENTION

It is, therefore, an object of this invention to provide a method for retorting high molecular weight organic materials selected from the group consisting of oil shale, tar sands, solvent refined coal, petroleum residua, polyethylene, polystyrene, heavy oil, bitumen, and rubber wastes, that will provide a high yield of a liquid product.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, a novel, continuous process for retorting high molecular weight organic materials selected from the group consisting of oil shales, tar sands, solvent refined coals, petroleum residua, polyethylene, polystyrene, heavy oil, bitumen, and rubber wastes, is provided. A feed stream comprised of the organic material and an associated quantity of mineral matter is continuously mixed with a hot acidic catalyst recycle stream, to provide a mixed stream of organic material, mineral matter, and hot acidic catalyst. The acidic catalyst must have the property of being able to appreciably adsorb alkenes on surface sites when at temperatures in the approximate range from 350 to 500 degrees centigrade. The hot acidic catalyst should have a temperature within the approximate range from 600 to 800 degrees centigrade as the acidic catalyst recycle stream enters the mixed stream. Preferred acidic catalysts are any montmorillonite, any bentonite, H type Y-zeolite, any acidic M type Y-zeolite, and any olefin polymerization catalyst.

The mixed stream of organic material, mineral matter, and hot acidic catalyst, when at a temperature in the approximate range from 425 to 525 degrees centigrade, is next continuously introduced, or fed, into a pyrolyzer. At the same time, a circulating stream comprised of pyrolysis gas that is enriched in olefins, is continuously swept, or fed, into the pyrolyzer and through the organic material and hot acidic catalyst of the mixed stream. As a result of pyrolysis occuring within the pyrolyzer, the mixed stream becomes comprised of spent organic material, mineral matter, and relatively cool acidic catalyst, and the pyrolysis gas of the circulating stream becomes relatively depleted in olefins. Importantly, a relatively high yield of a liquid product is produced. Gas formation is minimized. In this inventive process, olefin enriched gas is used as a trapping agent for removing gas precursors in the form of oil. This valuable liquid product is continuously condensed and removed from the pyrolyzer, and may be beneficially utilized in a large number of ways, for example, by being upgraded to transportation fuels or other synthetic petroleum products.

Following pyrolysis, the mixed stream, now comprised of spent organic material, mineral matter, and relatively cool acidic catalyst, is continuously withdrawn from the pyrolyzer. At this point in the inventive process, the spent organic material is continuously combusted, with air or oxygen, preferably in a combustor, to once again heat the acidic catalyst. Concurrently, the circulating stream that is now comprised of pyrolysis gas that is relatively depleted in olefins, is continuously exhausted from the pyrolyzer. This olefin depleted pyrolysis gas is continuously enriched in olefins, preferably by being passed over an olefin-enrichment catalyst, over hot acidic catalyst, or over waste mineral matter. The circulating stream of now olefin enriched pyrolysis gas is once again continuously swept, or fed, into the pyrolyzer and through the fresh organic material, mineral matter, and hot acidic catalyst of the mixed stream, as described above. The reheated, hot acidic catalyst is separated from the waste mineral matter of the mixed stream, preferably in the combustor, to form the recycle stream of hot acidic catalyst that is continuously mixed with the feed stream of fresh organic material, as described above.

The benefits and advantages of the present invention, as embodied and broadly described herein, include, inter alia, the provision of a process for retorting high molecular weight organic materials selected from the group consisting of oil shale, tar sands, solvent refined coal, petroleum residua, polyethylene, polystyrene, heavy oil, bitumen, and rubber wastes, that provides a high yield of a liquid product.

BRIEF DESCRIPTION OF THE DRAWINGS

The accompanying drawings, which are incorporated herein and form a part of the specification, illustrate an embodiment of the invention and, together with the description, serve to explain the principles of the invention. In the drawings.

DETAILED DESCRIPTION OF THE INVENTION

Figure 1:
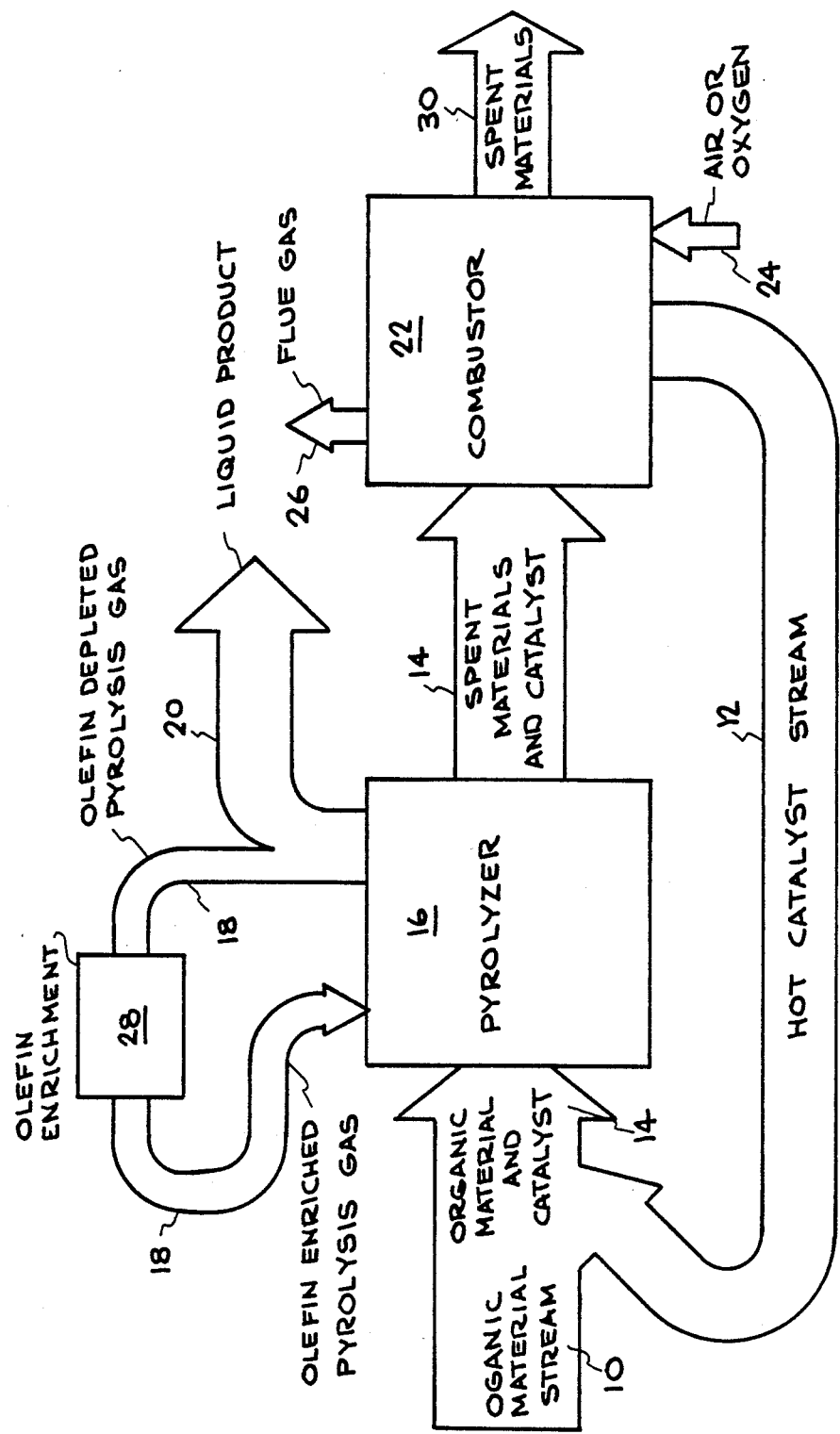
FIG. 1 is a schematic flowsheet of the continuous retorting process of this invention.

This inventive process is particularly well suited for those organic materials that form pyrobitumen with very little concurrent gas or coke formation—those materials where coke and gas become important products only toward the end of pyrolysis. Initial pyrolysis products migrate to surface sites on the solid heat carrier where coking and cracking will normally occur. By introducing as heat carrier an acidic catalyst with active sites that have a particular affinity for olefins, the driving force for coking and cracking, i.e. gas formation, can be eliminated or diminished when olefins occupy the active sites. The olefins polymerize slightly while trapping gas precursors, thus liquid product (oil) yield is maximized and gas yield minimized.

A key unique aspect of this invention is the role of olefins, conveniently obtained by unsatuating a hydrocarbon-rich pyrolysis gas. These olefins are brought in contact with an organic material's pyrolysis intermediates using a catalyst that concentrates the olefins at reactive sites. Catalysts must adsorb olefins but should not promote coke formation. Coking potential of the catalyst with regard to a particular organic material can be determined by pyrolyzing the material in a hot fluidized bed of the catalyst and measuring char formed (combustion techniques can be used). The chemistry occurs primarily at active sites on the catalyst surface; transport of the organic materials into pores is relatively inefficient. Preferred catalysts have large surface areas (small particle size) with a high density of active surface sites. For a given catalyst, olefin incorporation increases as particle size decreases.

Reference will now be made in detail to the present preferred embodiment of the inventive process of this invention, which is illustrated by the accompanying drawings. Reference is first made to the schematic flowsheet of FIG. 1, which gives a general overview of the process. A fresh, high molecular weight organic material feed stream 10, that is comprised of a quantity of any mineral matter and an organic material selected from the group consisting of oil shale, tar sands, solvent refined coals, petroleum residua, polyethylene, polystyrene, heavy oil, bitumen, and rubber wastes, is continuously mixed with a hot acidic catalyst recycle stream 12, and a resulting organic material, mineral matter, and acidic catalyst mixed stream 14 is continuously introduced into a pyrolyzer 16. The mineral matter of stream 10 is very often that which naturally occurs along with the organic material of stream 10. Catalyst recycle stream 12 is used as a heat carrier in the process. The acidic catalyst of stream 12 must have a temperature in the approximate range from 600 to 800 degrees centigrade, and be able to appreciably adsorb alkenes on surface sites when at temperatures in the approximate range from 350 to 500 degrees centigrade. The hot acidic catalyst, mineral matter, and organic material mixture equilibrate in temperature within seconds to a temperature in the approximate range from 425 to 525 degrees centigrade. A circulating stream 18, comprised of olefin enriched pyrolysis gas, is continuously swept into pyrolyzer 16 and through the fresh organic material and hot acidic catalyst of mixed stream 14. During the process of pyrolysis that occurs within pyrolyzer 16, and requires a time on the order of a minute at 500 degrees centigrade, the acidic catalyst of mixed stream 14 brings the olefins of circulating stream 18 into contact with the organic material of mixed stream 14, with the result that the pyrolysis produces a markedly increased yield of a liquid product 20, that is continuously removed from pyrolyzer 16. Following pyrolysis, the mixed stream 14, now comprised of spent organic material, mineral matter, and relatively cool acidic catalyst, is continuously withdrawn from pyrolyzer 16, and then continuously introduced into a combustor 22, whereat the spent organic material is continuously combusted in air or oxygen, indicated by an arrow 24, to thereby reheat the acidic catalyst. Flue gas is indicated by an arrow 26. Also following the pyrolysis that occurs in pyrolyzer 16, the circulating stream 18, now comprised of pyrolysis gas that is relatively depleted in olefins, is continuously exhausted from the pyrolyzer 16, as liquid product 20 is condensed and removed from pyrolyzer 16. Stream 18 is continuously passed rapidly over an olefin enrichment catalyst, over hot acidic catalyst as described above, or over burnt or waste mineral matter, in an olefin enrichment unit 28. Olefin enrichment catalysts thermally convert hydrocarbons to ethylene, propylene, butylenes and other alkenes, and are commonly used and very well known in the petroleum industry. In this manner circulating stream 18 once again becomes comprised of olefin enriched pyrolysis gas. Following olefin enrichment, circulating stream 18 is again introduced or swept into pyrolyzer 16, as part of the continuing process described above. In the combustor 22, the reheated and hot acidic catalyst and the spent mineral matter of mixed stream 14, are separated, with a continuous flow of spent mineral matter 30 exhausted from combustor 22, and with the hot acidic catalyst exhausted from combustor 22, to continuously provide hot acidic catalyst recycle stream 12, as described above.

Figure 2:
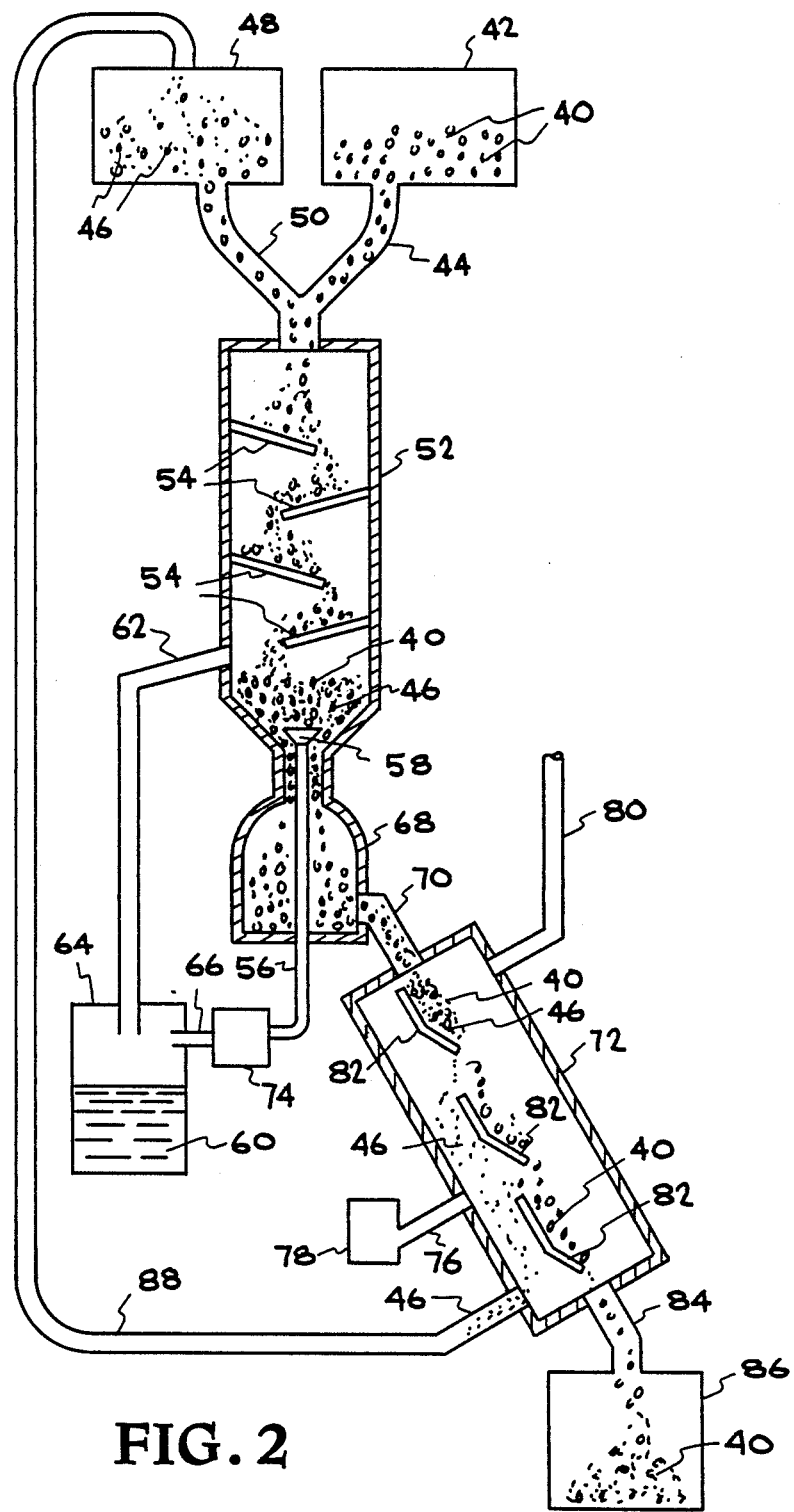
FIG. 2 is a partly schematic and partly diagrammatic flow illustration of a system for carrying out the continuous retorting process of FIG. 1.

Reference is now made to the partly schematic and partly diagrammatic flow illustration of FIG. 2, that depicts the presently preferred means of carrying out the continuous process for retorting various organic materials of this invention. A quantity of a mineral matter together with a high molecular weight organic material, 40, with the organic material selected from the group consisting of oil shale, tar sands, solvent refined coal, petroleum residua, polyethylene, polystyrene, heavy oil, bitumen, and rubber wastes, as defined above, that has been crushed, pulverized or ground, over a very broad size range, is accumulated in a fresh organic material recepticle 42. The mineral matter is very often that which naturally occurs along with the organic material. The material 40 from recepticle 42 is formed into a feed stream, by any convenient gravity assisted or mechanical means, by way of a fresh organic material feed stream pipe 44. In the case of materials that contain relatively little mineral matter, appropriate steps must be taken to avoid sticking, as well understood in the chemical and engineering arts.

A quantity of hot acidic catalyst 46, is retained and accumulated in a hot acidic catalyst recepticle 48 and formed, by any convenient gravity assisted or mechanical means, into a recycle stream by way of a hot acidic catalyst recycle stream pipe 50. The acidic catalyst in pipe 50 should have a temperature in the approximate range from 600 to 800 degrees centigrade. The acidic catalyst used in the practice of this invention must be able to appreciably adsorb alkenes on surface sites when at temperatures in the approximate range from 350 to 500 degrees centigrade. Preferred acidic catalysts for use in this inventive process are: any montmorillonite; any bentonite; any acidic H type Y-zeolite; any acidic M type Y-zeolite; and, any olefin polymerization catalyst. Montmorillonite is defined herein as dehydrated $(_{0.5}Ca,Na)_{0.7}$ $(Al,Mn,Fe)_4$ $(Si,Al)_8O_{20}(OH)_4nH_2O$ in all its native and synthetic forms. Bentonite is defined herein as a layered aluminum silicate having a structure similar to that of montmorillonite. Acidic H type Y-zeolite is defined herein as an acidic cracking catalyst that is well known in the petroleum industry. Acidic M type Y-zeolite is defined herein as an ion exchange zeolite with a metal ion (M) that gives it Bronsted acidity, as well known in the petroleum industry Olefin polymerization catalysts are defined herein as catalysts that are very well known in the petroleum industry, with a typical example being phosphoric acid on alumina. The catalysts used in the practice of this invention are very selective in minimizing the formation of C1–C2 hydrocarbons. Materials that adsorb ethylene but not ethane, as demonstrated by inverse gas chromatography at 150 to 200 degrees centigrade, will be effective catalysts in the practice of this invention. Increasing surface area by grinding may sometimes make an otherwise weakly active or inactive material into an active catalyst since surface sites are of primary importance.

The materials in fresh organic material feed stream pipe 44 and hot acidic catalyst recycle stream pipe 50 are continuously mixed in a ratio that allows them to reach a temperature in the approximate range from 425 to 525 degrees centigrade, and introduced into a pyrolyzer 52, as shown. Material 40 and acidic catalyst 46 are mixed by a plurality of baffles 54, schematically indicated. At the same time, an olefin enriched pyrolysis gas is continuously swept into pyrolyzer 52 through an olefin enriched pyrolysis gas circulating stream pipe 56 that terminates in a pyrolysis gas exit nozzle 58, as shown. Pyrolyzer 52 may be any solid/recycle device adapted for pyrolysis gas recycle, as well understood in the arts related to the processing of oil shale. A fluidized-bed or the "Apparatus for Oil Shale Retorting" taught by Lewis et al in U.S. Pat. No. 4,619,738 issued Oct. 28, 1986, would each be very well suited for slightly modified use as pyrolyzer 52. As the olefin enriched pyrolysis gas from pipe 56 and nozzle 58 is continuously swept through the well mixed fresh organic material 40 and hot acidic catalyst 46, pyrolysis occurs within pyrolyzer 52. As a result of this pyrolysis, an increased yield of a liquid product 60 is produced and removed from pyrolyzer 52 via liquid product pipe 62, and stored in liquid product receptacle 64. Additionally, pyrolysis gas that is relatively depleted in olefins is also continuously exhausted from pyrolyzer 52 through pipe 62, into receptacle 64, and then into an olefin depleted pyrolysis gas circulating stream pipe 66. The pyrolysis gas that is relatively depleted in olefins is then continuously fed from pipe 66 into an olefin-enrichment unit 74, as shown. Within unit 74 the olefin depleted pyrolysis gas is either passed over an olefin-enrichment catalyst, as defined above, over hot acidic catalyst, or over burnt or waste mineral matter, as schematically indicated. From unit 74, olefin enriched pyrolysis gas enters circulating stream pipe 56, as discussed above. The olefin-enrichment process may be performed in situ in the pyrolyzer.

Also following pyrolysis, the mixed stream of now spent mineral matter and charred organic material 40, and relatively cool acidic catalyst 46, is continuously withdrawn from pyrolyzer 52 into a receptacle 68, from which it is continuously fed, via a pipe 70, into a combustor 72. Within combustor 72, the spent mineral matter and charred organic material 40 is continuously combusted to reheat the relatively cool acidic catalyst 46. The process of combustion is fueled by oxygen or air introduced, via pipe 76, from oxygen or air unit 78, schematically indicated. Combustion products are exhausted from combustor 72 via flue pipe 80. The remaining mineral matter 40 and hot acidic catalyst 46 are separated by any appropriate method, for example, by a plurality of grates 82, schematically indicated, with the waste mineral matter 40 eliminated from combustor 72, via an exit pipe 84, to a waste receptacle 86. The separated hot acidic catalyst 46 is continuously fed into a hot catalyst pipe 88, and transported, by any convenient and appropriate means, to hot acidic catalyst receptacle 48, as described above.

It is thus appreciated that in accordance with the invention as herein described as shown in FIGS. 1 and 2, an efficient, continuous process for retorting high molecular weight organic materials selected from the group consisting of oil shale, tar sand, solvent refined coal, petroleum residua, polyethylene, polystyrene, heavy oil, bitumen, and rubber wastes, that produces a high yield of liquid product, is provided.

The foregoing description of a preferred embodiment of this invention that uses olefin enriched gas, in the presence of an acidic catalyst, as a trapping agent for removing gas precursors in the form of oil, has been presented for purposes of illustration and description. It is not intended to be exhaustive or to limit the invention to the precise form disclosed, and obviously many modifications and variations are possible in light of the above teaching. For example, valuable gaseous components, such as hydrogen, may be removed at various points from the circulating pyrolysis gas stream. Further, in addition to in situ olefin-enrichment, the pyrolysis gas stream may be directly supplied as a non-circulating source of ethylene, propylene, isobutylene, or any mixture thereof. Additionally, the method may be adapted for batch processing. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A continuous process for retorting a high molecular weight organic material selected from the group consisting of oil shale, tar sands, solvent refined coal, petroleum residue, polyethylene, polystyrene, heavy oil, bitumen, and rubber wastes, the process comprising the steps of:

continuously mixing a feed stream, comprised of the organic material and a quantity of mineral matter, with a recycle stream, comprised of a hot acidic catalyst having a temperature in the approximate range from 600 to 800 degrees centigrade, the acidic catalyst being able to appreciably adsorb alkenes on active surface sites when at temperatures in the approximate range from 350 to 500 degrees centigrade, to thereby produce a mixed stream, comprised of the organic material, mineral matter, and not acidic catalyst;

continuously introducing the mixed stream, comprised of the organic material, mineral matter, and hot acidic catalyst and having a temperature in the approximate range from 425 to 525 degrees centigrade, into a pyrolyzer;

continuously sweeping a circulating stream, comprised of pyrolysis gas that is enriched in olefins, into the pyrolyzer and through the organic material and hot acidic catalyst of the mixed stream, whereby the olefins or, equivalently, the alkenes in the pyrolysis gas occupy the active surface sites of the acidic catalyst and polymerize slightly while trapping gas precursors to thereby eliminate or diminish gas formation, and whereby pyrolysis occurs and the mixed stream becomes comprised of spent organic material, mineral matter, and relatively cool acidic catalyst, the circulating stream becomes comprised of pyrolysis gas that is relatively depleted in olefins, and a maximized amount of a liquid product is produced;

continuously removing the liquid product from the pyrolyzer;

continuously withdrawing the mixed stream, comprised of spent organic material, mineral matter, and relatively cool acidic catalyst, from the pyrolyzer;

following the continuously withdrawing step, continuously combusting, in air or oxygen, the spent organic material and mineral matter of the mixed stream, whereby the relatively cool acidic catalyst is heated and once again becomes hot acidic catalyst;

continuously exhausting the circulating stream, comprised of pyrolysis gas that is relatively depleted in olefins, from the pyrolyzer;

following the continuously exhausting step, continuously enriching the circulating stream in olefin content, whereby the circulating stream once again becomes comprised of pyrolysis gas that is enriched in olefins;

following the continuously enriching step, continuously using the circulating stream comprised of pyrolysis gas that is enriched in olefins in carrying out the continuously sweeping step;

following the continuously combusting step, continuously separating the hot acidic catalyst from the mineral matter of the mixed stream, whereby the recycle stream, comprised of hot acidic catalyst, is produced; and continuously employing the recycle stream, comprised of hot acidic catalyst, that results from the continuously separating step, in carrying out the continuously mixing step.

2. A continuous process for retorting a high molecular weight organic material, as recited in claim 1, wherein the acidic catalyst is a montmorillonite.

3. A continuous process for retorting a high molecular weight organic material, as recited in claim 1, wherein the acidic catalyst is a bentonite.

4. A continuous process for retorting a high molecular weight organic material, as recited in claim 1, wherein the acidic catalyst is an acidic H type Y-zeolite.

5. A continuous process for retorting a high molecular weight organic material, as recited in claim 1, wherein the acidic catalyst is an acidic M type Y-zeolite.

6. A continuous process for retorting a high molecular weight organic material, as recited in claim 1, wherein the acidic catalyst is an olefin polymerization catalyst.

7. A continuous process for retorting a high molecular weight organic material, as recited in claim 1, wherein the continuously combusting step and the continuously separating step, are carried out in a combustor.

8. A continuous process for retorting a high molecular weight organic material, as recited in claim 1, wherein the continuously enriching step is carried out by passing the circulating stream comprised of pyrolysis gas that is relatively depleted in olefins over an olefin-enrichment catalyst.

9. A continuous process for retorting a high molecular weight organic material, as recited in claim 1, wherein the continuously enriching step is carried out by passing the circulating stream comprised of pyrolysis gas that is relatively depleted in olefins over the hot acidic catalyst.

* * * * *